UNITED STATES PATENT OFFICE.

THOMAS JESPERSEN, OF NEENAH, WISCONSIN, ASSIGNOR, BY MESNE ASSIGNMENTS, TO LINCOLN TRUST COMPANY, OF NEW YORK, N. Y., A CORPORATION OF NEW YORK.

METHOD FOR RECOVERING WASTE PAPER.

1,424,411.

Specification of Letters Patent. Patented Aug. 1, 1922.

No Drawing. Application filed December 15, 1916, Serial No. 137,131. Renewed December 22, 1921. Serial No. 524,296.

*To all whom it may concern:*

Be it known that I, THOMAS JESPERSEN, a citizen of the United States, residing at Neenah, county of Winnebago, State of Wisconsin, have invented a new and useful Method for Recovering Waste Paper, of which the following is a specification.

My invention relates to the treatment of waste paper stock such as newspaper or other paper printed with ink containing a mineral oil vehicle, so as to remove the ink from the fibre. It consists substantially in subjecting such stock to the action of sodium silicate, or of sodium silicate and calcium hydroxide. The stock so treated may be used for the manufacture of new print paper, either alone or in admixture with other stock, for instance new stock.

I desire it to be understood that I do not here claim the application of my method to paper stock containing printers' ink in which the vehicle consists entirely of vegetable oils or contains no mineral oil. The problem presented by the proposed removal of ink containing such vehicles differs from that presented by the removal of ink the vehicle of which consists in whole or in part of mineral oil; moreover calcium hydroxide would form with the vegetable oil a water insoluble calcium soap.

In the practice of my method I steep the waste paper stock, in a solution of sodium silicate (water glass) until the ink is softened sufficiently for removal by washing and pulping the paper. Agitation of the mixture of paper and solution during the steeping step is desirable, although not essential if care be taken that every particle of paper is brought into contact with the solution. The steeping may be carried on in a special container, and the paper then transferred to a washing engine in which it can be washed and pulped; or the steeping, washing and pulping may be carried on successively or simultaneously in the tank of a washing engine of any convenient type.

The solution may be used either hot or cold. It may be used in varying strengths, depending upon the hardness of the dried ink to be attacked. The harder the ink the stronger ought to be the solution. A one-half to one per cent solution will answer in most instances. About two hundred (200) pounds of the sodium silicate in 4,000 gallons of water may be used under average conditions to steep one ton of paper. The time required for steeping varies according to the character of the ink, but an exposure of from two to four hours will usually be found sufficient, at the end of which time substantially all the mineral oil carrying the pigment will have been loosened from the fibre.

By the following modification of my method I obtain still better results, especially in the form of a whiter pulp and resultant paper:—To the sodium silicate solution, preferably prior to the commencement of the operation, I add a quantity of calcium hydroxide (milk of lime). The calcium hydroxide will re-act with the sodium silicate to form a precipitate which I believe to be a double silicate of calcium and soda. This precipitate has a marked beneficial effect in obtaining a whiter pulp. A possible explanation of this result is that the precipitate may assist by a scouring action, or by enveloping particles of the carbon or other pigment of the ink and carrying them away, or by concealing their presence if still remaining in the pulp after the washing operation is completed, or possibly by a combination of two or of all of these actions. I may vary the proportions of the calcium hydroxide added. I have found in practice that I obtain good results by adding an amount of calcium hydroxide substantially less than will re-act with all of the sodium silicate; thus I may add to the two hundred (200) pounds of sodium silicate in the above example the slaked lime obtained from fifty (50) pounds of commercial quicklime. However, the addition of a larger proportion of calcium hydroxide will not prevent the working of my method, because the substance enters but slowly into solution, and the re-action will not be completed before the sodium silicate has had an opportunity to loosen the ink.

After the printers' ink has been lifted or removed from the paper, I may remove the ink from the container by rotary screens, or other well known mechanical means, and then manipulate the cleaned pulp in the well known manner to produce new paper or paper board. I may also omit the step of removing the ink from the container, but mix the mineral oil and its contained pigment with the paper, for instance by dropping the unwashed mass into the cistern. In this case I should obtain a slightly colored paper which is suitable for many purposes, even for receiving impressions with printers' ink.

I desire it to be understood that when I speak in this specification of sodium silicate I have reference to what is known as commercial sodium silicate. This commercial sodium silicate is in the form of a solution (or of a solid which must be boiled in water for several hours to form a solution), and is a complex substance, the nature of which, and the behavior of which with other chemicals, is not clearly understood. Even the various grades of the commercial substance show marked differences in effect when used in my process; I have found a grade, having a viscosity of 16.6, which is not commercially practicable, while a grade having a viscosity of 4.3 (although almost identical with the former in soda and silica content) gave splendid results, either alone, or in combination with calcium hydroxide. It is probable that the higher viscosity interferes seriously with the commercial availability of the substance for use in my method.

When I speak in my claims of waste paper stock as specified, I refer to stock containing printers' ink in which the vehicle consists in whole or in part of mineral oil.

I claim:

1. The process of removing printer's ink containing a mineral oil vehicle from waste paper stock which comprises the step of treating said stock with sodium silicate solution, substantially as and for the purpose described.

2. The process of removing printer's ink containing a mineral oil vehicle from waste paper stock which comprises the step of treating said stock with a liquor containing sodium silicate, and calcium hydroxide, substantially as and for the purpose described.

In testimony whereof I have hereunto set my hand.

THOMAS JESPERSEN.